United States Patent
Xin (10) Patent No.: US 10,032,327 B1
(45) Date of Patent: Jul. 24, 2018

(54) ACCESS CONTROL SYSTEM WITH FACIAL RECOGNITION AND UNLOCKING METHOD THEREOF

(71) Applicant: BEIJING JIALAN TECHNOLOGY CO., LTD., Beijing (CN)

(72) Inventor: Mingjiang Xin, Shanghai (CN)

(73) Assignee: BEIJING JIALAN TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/481,518

(22) Filed: Apr. 7, 2017

(30) Foreign Application Priority Data

Jan. 25, 2017 (CN) .......................... 2017 1 0056099

(51) Int. Cl.
 *G07C 9/00* (2006.01)
 *G06K 9/00* (2006.01)
 *E05B 17/22* (2006.01)

(52) U.S. Cl.
 CPC ........ *G07C 9/00158* (2013.01); *E05B 17/226* (2013.01); *G06K 9/00228* (2013.01); *G06K 9/00288* (2013.01); *G07C 9/00563* (2013.01)

(58) Field of Classification Search
 CPC ............ G07C 9/00158; G07C 9/00563; E05B 17/226; G06K 9/00288; G06K 9/00228
 See application file for complete search history.

(56) References Cited

U.S. PATENT DOCUMENTS

| | | | | |
|---|---|---|---|---|
| 7,127,087 | B2* | 10/2006 | Huang | G06K 9/00228 382/118 |
| 8,538,078 | B2* | 9/2013 | Berkovich | G06F 17/30247 345/419 |
| 8,542,879 | B1* | 9/2013 | Nechyba | G06K 9/00228 382/103 |
| 2001/0031072 | A1* | 10/2001 | Dobashi | G06K 9/00228 382/118 |
| 2004/0151349 | A1* | 8/2004 | Milne, III | G06K 9/00208 382/115 |
| 2006/0190419 | A1* | 8/2006 | Bunn | G06N 99/005 706/2 |
| 2008/0247611 | A1* | 10/2008 | Aisaka | G06K 9/00261 382/118 |
| 2010/0135541 | A1* | 6/2010 | Lai | G06K 9/00208 382/118 |
| 2010/0246906 | A1* | 9/2010 | Lovell | G06K 9/00234 382/118 |

(Continued)

*Primary Examiner* — Brian Miller
(74) *Attorney, Agent, or Firm* — Tianchen LLC (57) ABSTRACT

An access control system with facial recognition comprising a casing, a door handle, an interaction unit, a locking unit, a triggering unit controlling an unlock/lock state of the locking unit and a facial recognition unit. The interaction unit has an operation panel arranged above the door handle and protruded from the casing at an inclined acute angle relative to a vertical surface of the casing. The facial recognition unit comprises a data storage module, an image collection module comprising an infrared camera and an optical camera for user face scanning, an image processing module and a determination module. The infrared camera and the optical camera are fixed on the operation panel of the interaction unit, which enables authentication for users of different heights. Furthermore, the access control system can also be unlocked by passcode and/or a RFID card.

13 Claims, 5 Drawing Sheets

(56) References Cited

U.S. PATENT DOCUMENTS

| | | | |
|---|---|---|---|
| 2011/0164792 A1* | 7/2011 | Yoon | G06K 9/00214 |
| | | | 382/118 |
| 2011/0188712 A1* | 8/2011 | Yoo | G06K 9/00 |
| | | | 382/118 |
| 2012/0075452 A1* | 3/2012 | Ferren | G02B 13/0065 |
| | | | 348/78 |
| 2013/0008958 A1* | 1/2013 | Smith | G07C 9/00904 |
| | | | 235/382 |
| 2016/0300410 A1* | 10/2016 | Jones | G06K 9/00288 |
| 2016/0350618 A1* | 12/2016 | Meekins | G06T 15/04 |
| 2016/0364009 A1* | 12/2016 | Lemberger | H04N 21/4424 |
| 2017/0289147 A1* | 10/2017 | Kyllonen | H04L 63/0861 |

* cited by examiner

ACCESS CONTROL SYSTEM WITH FACIAL RECOGNITION AND UNLOCKING METHOD THEREOF

CROSS-REFERENCE TO RELATED APPLICATION

This application claims the priority benefit of China application Serial No. 201710056099.0, filed Jan. 25, 2017. All disclosure of the China application is incorporated herein by reference.

FIELD OF THE INVENTION

The present invention relates to the field of biometric recognition, particularly to a method of unlocking a door or a safe using facial recognition technology. Specifically, the present invention relates to an access control system with facial recognition and unlocking method thereof.

BACKGROUND OF THE INVENTION

Access control system is rapidly developed along with the progress of the automatic recognition technology. After the developments of the first generation of the access control technology (using keyboard passcodes), the second generation of the access control technology (using magcards), and the third generation of the access control technology (using contact-type IC cards), RFID and biometric recognition have become main access control technologies of the present day.

An access control system with biometric recognition uses human biological characteristics such as fingerprints, palmprints, voice and face as a key to access control, based upon the fact that the probability of two identical biological characteristics of two different people is less than one part per billion.

In the recent years, the progress of biometric authentication has brought a leap in the development of access control. Compared with the biometric authentication using other biometric characteristics (fingerprints, vein, iris, etc.), facial recognition is the most natural and most direct means for identification verification since it is initiative, non-invasive, user-friendly, and easily accepted.

The face-to-unlock technology allows a user to unlock an access control system of a door or a safe by facial recognition. It is well known to those skilled in the art that the face-to-unlock technology requires facial characteristics analysis based on reference facial image data and camera data. Wherein, facial characteristic analysis based on reference optical facial image data and optical camera data is a mainstream technology currently.

However, the conventional facial characteristic analysis based on 2D/3D reference optical facial image data and optical camera data has the following deficiencies.

Firstly, the security is unsatisfied due to that an imposter may be able to unlock the access control system by using a 2D image photo taken by an optical camera or a 3D dummy of a user, and such imposturous unlock by a photo, video or wax of the user is unrecognized.

Secondly, if the reference optical facial image and the optical camera image are 3D images taken by an optical camera, complex 3D algorithms are needed to extract and analyze the facial characteristics, which requires a high background process capability of the access control system.

However, an access control system of a door or a safe which is powered by DC power source lacks such capability.

SUMMARY OF THE INVENTION

To achieve the above object, the present invention provides an access control system with facial recognition.

The access control system with facial recognition comprises: a casing; a door handle; an interaction unit; a locking unit, a triggering unit controlling an unlock/lock state of the locking unit and a facial recognition unit which are embedded inside the casing. The interaction unit has an operation panel arranged above the door handle and protruded from the casing at an inclined acute angle relative to a vertical surface of the casing. The facial recognition unit comprises a data storage module, an image collection module, an image processing module and a determination module. The image collection module comprises an infrared camera and an optical camera which are disposed on the operation panel of the interaction unit in parallel having optical axes perpendicular to the operation panel. The image processing module receives multiple image data pairs of a same target face which are collected by the infrared camera and the optical camera during a predetermined time, wherein each image data pair is consisted by image data collected by the infrared camera and image data collected by the optical camera at the same time. The image processing module extracts facial characteristics of the target face from the image data pairs to form 2D image data pairs of infrared facial characteristics and optical facial characteristics, and defines a facial characteristic region for each 2D image data pair. Wherein, the facial characteristics comprises facial feature points and positional parameters of the facial feature points. The positional parameters comprise coordinates of the facial feature points and distances between the facial feature points. When the access control system is initialized, each 2D image data pair of the infrared facial characteristics and the optical facial characteristics is stored in the storage module as a reference facial pattern of one target face, and different reference facial patterns of different target faces form a reference facial pattern group. The determination module determines whether the image data pairs are collected from a real person according to the image data collected by the infrared camera, and further compares the 2D image data pairs of the infrared facial characteristics and the optical facial characteristics with the reference facial pattern group to determine whether a similarity between at least one of the 2D image data pairs and at least one of the reference facial patterns in the facial pattern group is within a threshold range. The triggering unit controls the unlock/lock state of the locking unit according to determination results from the determination module.

Preferably, the facial feature points of a target face are distributed on a facial contour curve, ears, eyebrows, eyes, nose and/or lips of the target face.

Preferably, wherein the positional parameters of the facial feature points in each 2D image data pair of infrared facial characteristics and optical facial characteristics are determined according to the coordinates of feature points and the distance between the feature points.

Preferably, the threshold range is defined according to an allowable deviation range of each distance between the facial feature points of the target face and a corresponding distance between the same facial feature points in the reference facial pattern.

Preferably, the operation panel of the interaction unit comprises an image display region for displaying an image of the target face captured by the optical camera, a touchscreen region for human interaction, and a hardware button region for turning on and turning off power and/or the infrared camera and the optical camera.

Preferably, the image collection module comprises a pretreatment submodule which displays the image of the target face captured by the optical camera on the image display region before the infrared camera and the optical camera collecting the image data pairs, such that the user can adjust his position to place the facial features within a pane of the image display region.

Preferably, the acute angle is between 33° to 34°.

Preferably, the reference facial pattern of the target face stored in the storage module is a latest collected 2D image data pair of the infrared facial characteristics and the optical facial characteristics of the target face.

Preferably, the image collection unit comprises an infrared light lamp to increase an illumination intensity for the optical camera.

Preferably, the optical camera is a dual lens optical camera.

Preferably, the access control system with facial recognition further comprises a management module. The management module manages log files and other unlocking means including passcode unlocking, RFID unlocking and/or unlocking via mechanical tools.

Preferably, the access control system with facial recognition further comprises a WIFI module. The WIFI module enables user remote unlocking.

The present invention further provides an unlocking method of the above access control system with facial recognition. The method comprises a step S1 of initialization and a step S2 of facial recognition.

The step S1 comprises the following steps:

S11: entering an initialization mode in which the infrared camera and the optical camera collect multiple image data pairs of a target face during a predetermined time; wherein each image data pair is consisted by image data collected by the infrared camera and image data collected by the optical camera at the same time;

S12: extracting facial characteristics of the target face from the image data pairs to form 2D image data pairs of infrared facial characteristics and optical facial characteristics and defining a facial characteristic region for each 2D image data pair. Wherein, each 2D image data pair of the infrared facial characteristics and the optical facial characteristics is taken as a reference facial pattern of the target face; the facial characteristics comprises facial feature points of the target face and positional parameters of the facial feature points; the positional parameters comprise coordinates of the facial feature points and distances between the facial feature points.

S13: storing the reference facial patterns of the target face in the storage module, wherein different reference facial patterns of different target faces stored in the storage module form a reference facial pattern group.

The step S2 comprises the following steps:

Step S21: entering a recognition mode in which the infrared camera and the optical camera collect multiple image data pairs of a same target face during the predetermined time; wherein each image data pair is consisted by image data collected by the infrared camera and image data collected by the optical camera at the same time;

Step S22: extracting facial characteristics of the target face from the image data pairs to form 2D image data pairs of infrared facial characteristics and optical facial characteristics and defining a facial characteristic region for each 2D image data pair. Wherein, the facial characteristics comprises facial feature points of the target face and positional parameters of the facial feature points; the positional parameters comprise coordinates of the facial feature points and distances between the facial feature points.

Step S23: determining whether the image data pairs are collected from a real person according to the image data collected by the infrared camera; if yes, turning to step S24; or else, displaying unlock failed and turning to step S25;

Step S24: comparing the 2D image data pairs of the infrared facial characteristics and the optical facial characteristics with the reference facial patterns to determine whether a similarity between at least one of the 2D image data pairs and at least one of the facial patterns in the facial pattern group is within a threshold range; if yes, unlocking the locking unit; or else, turning to step S25;

Step S25: ending unlocking.

From above, it is known that according to the access control system of the present invention, an interaction unit is disposed outside a casing of the access control system with an operation panel protruded from the casing at an inclined acute angle relative to a vertical surface of the casing, and an infrared camera and a dual lens optical camera with high resolution for user face scanning are fixed on the operation panel of the interaction unit, which enables authentication for users of different heights. Furthermore, the access control system can also be unlocked by passcode and/or a RFID card.

DETAILED DESCRIPTION OF THE EMBODIMENTS

Reference will now be made in detail to the present preferred embodiments to provide a further understanding of the invention. The specific embodiments and the accompanying drawings discussed are merely illustrative of specific ways to make and use the invention, and do not limit the scope of the invention or the appended claims.

The access control system with facial recognition and its unlocking method of the present invention will be described in further details hereinafter with respect to an embodiment and the accompany drawing FIG. 1-FIG. 7.

It is noted that, the term "administrator" used herein refers to a person who has the permission to manage the access control system, the term "user" used herein refers to a person who has the permission to unlock the access control system. It is clear that an administrator may also be a user.

Figure 1:
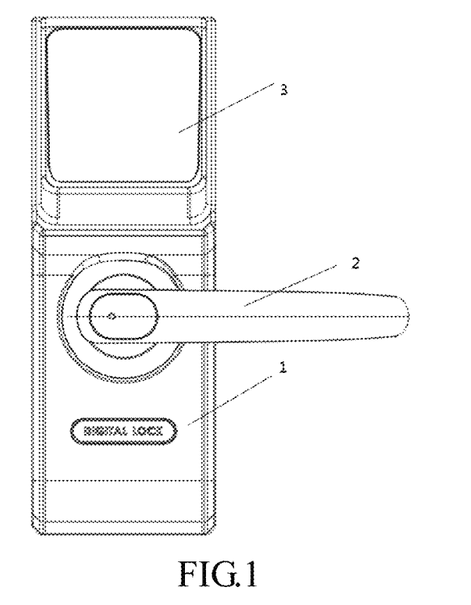
FIG. 1 is a front view of an access control system with facial recognition of the present invention.
Figure 2:
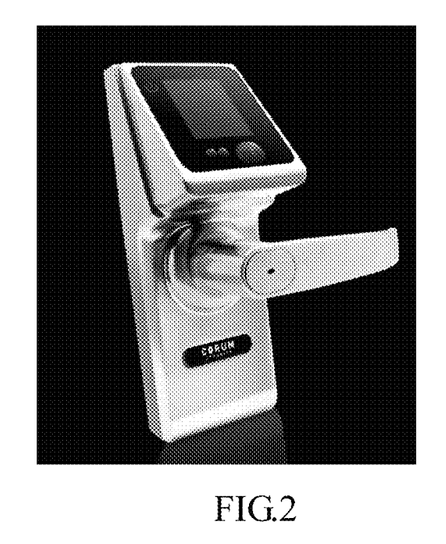
FIG. 2 is a rendered view of the access control system with facial recognition of the present invention, wherein an acute angle is formed between an operation panel of an interaction unit and a vertical surface of a casing.
Figure 3:
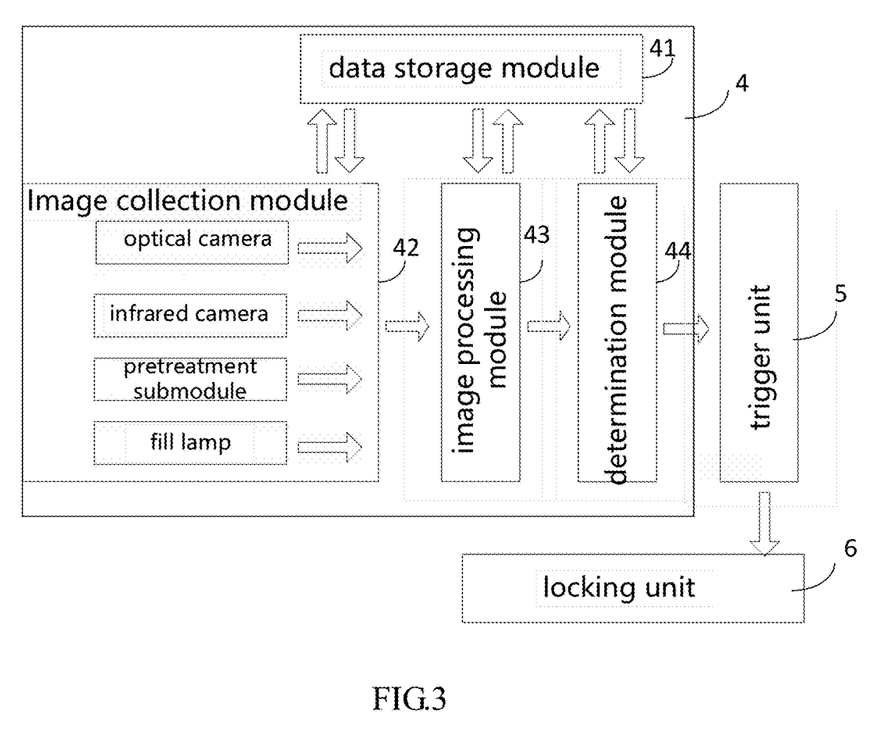
FIG. 3 is a schematic view of the access control system with facial recognition of the present invention.

Please refer to FIG. 1 to FIG. 3, the access control system comprises a casing 1, a door handle 2, an interaction unit 3 arranged above the door handle 2 and outside the casing 1, a locking unit 6, a triggering unit 5 controlling an unlock/lock state of the locking unit, a DC power unit (not shown) and a facial recognition unit 4. Wherein, the locking unit 6, the triggering unit 5, the DC power unit, and the facial recognition unit 4 are embedded within the casing 1.

As shown in FIG. 2, the interaction unit 3 has an operation panel protruded from the casing 1 at an inclined acute angle relative to a vertical surface of the casing. Preferably, the acute angle is between 33° to 34°. When unlocking, the user stands half or one step away from an entry door or a safe door on which the access control system is installed, and moves frontwards or backwards to achieve an expected image data input and face recognition status.

FIG. 3 is a schematic view of the access control system with facial recognition of the present invention. In the embodiment, the facial recognition unit 4 comprises a data storage module 41, an image collection module 42, an image processing module 43 and a determination module 44. In the present invention, two types of cameras (infrared camera and optical camera) are used to capture infrared images and color images. Specifically, the image collection module comprises an infrared camera and an optical camera which are disposed on the operation panel of the interaction unit 3 in parallel. The optical axes of the infrared camera and the optical camera are parallel to each other and perpendicular to the operation panel.

Furthermore, the operation panel of interaction unit comprises an image collection region, an image display region, a touchscreen region and a hardware button region. The image collection region is mounted with the image collection module. The image display module displays an image of a target face collected by the optical camera of the image collection module. The touchscreen region enables human interaction. The hardware button region has buttons to turn on and turn off power and/or the infrared camera and the optical camera.

In the embodiment, the infrared camera and the optical camera take pictures of the same target face at almost the same position and same direction, thus the optical color image data and infrared image data collected respectively thereby are correlated. The infrared camera and the optical camera can be considered to take pictures at the same position in principle.

In other embodiments of the present invention, when the infrared camera and the optical camera are installed away from each other, the differences between the position and direction of the infrared camera and the optical camera can also be modified by some compensation algorithms to simplify the subsequent determination process. Such differences can be modified by any conventional compensation algorithms, which is not detailed herein.

In addition, the image collection module comprises a pretreatment submodule which displays the image of the target face captured by the optical camera on the image display region before the process of the infrared camera and the optical camera image collecting the image data, such that the user can adjust his position to place the facial features within a pane of the image display region.

Figure 4:
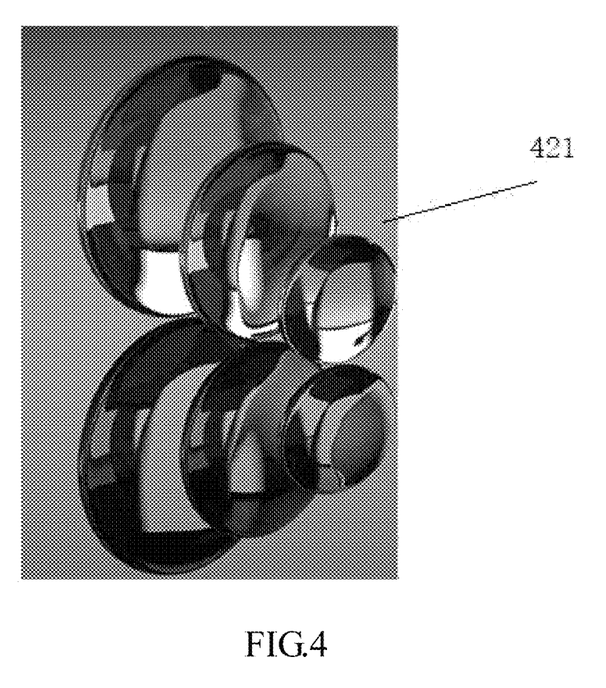
FIG. 4 is a schematic view of a dual lens optical camera of the access control system with facial recognition of the present invention.

Preferably, the image collection module further comprises an infrared light lamp to increase an illumination intensity for the optical camera (e.g. when taking images under insufficient lightening conditions). Moreover, as shown in FIG. 4, the optical camera can be a dual lens optical camera 421 to increase the resolution of the collected image data.

Please refer to FIG. 3, in a preferred embodiment, the image processing module 43 receives multiple image data pairs of a same target face which are collected by the infrared camera and the optical camera during a predetermined time. Wherein each image data pair is consisted by image data collected by the infrared camera and image data collected by the optical camera at the same time. The image processing module 43 extracts facial characteristics of the target face from the image data pairs to form a 2D image data pair of infrared facial characteristics and optical facial characteristics corresponding to each image data pair and further defines a facial characteristic region for each 2D image data pair.

Figure 5:
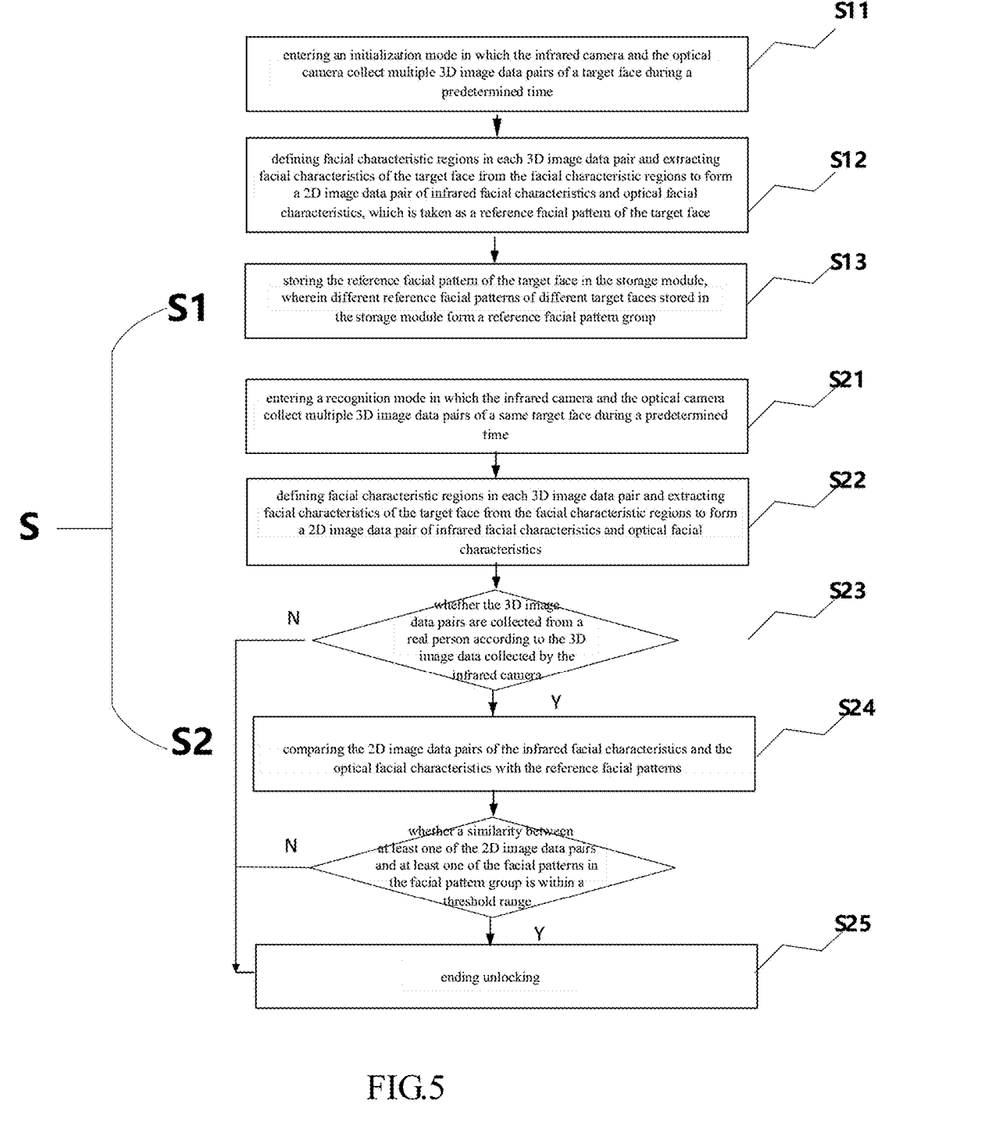
FIG. 5 is a view illustrating facial characteristics of a target face which comprises facial feature points and positional parameters of the facial feature points.

As shown in FIG. 5, the facial characteristics comprises facial feature points and positional parameters between the facial feature points of the target surface. The positional parameters comprise coordinates of the facial feature points and distances between the facial feature points. When the access control system is initialized, each 2D image data pair of the infrared facial characteristics and the optical facial characteristics is taken as a reference facial pattern of the target face and stored in the storage module. Different reference facial patterns of different target faces stored in the storage module form a reference facial pattern group.

In the embodiment, the determination module 44 serves the following two functions: firstly, the determination module determines whether the image data pairs are collected from a real person according to the image data collected by the infrared camera; secondly, it further compares the 2D image data pairs of the infrared facial characteristics and the optical facial characteristics with the reference facial patterns stored in the storage module to determine whether a similarity between at least one of the 2D image data pairs and at least one of the reference facial patterns is within a threshold range.

It is noted that, the threshold range is defined according to an allowable deviation range of each distance between the facial feature points of the target face and a corresponding distance between the same facial feature points in the reference facial pattern. For example, according to the accuracy requirement, each deviation of a distance between the facial feature points of the target face and a corresponding distance between the same facial feature points in the reference facial pattern should be less than a preset value; or an average deviation of the distances between the facial feature points of the target face and the corresponding distances between the same facial feature points in the reference facial pattern should be less than a preset value; or a weighted average deviation of the distances between the facial feature points of the target face and the corresponding distances between the same facial feature points in the reference facial pattern should be less than a preset value.

The triggering unit receives determination results from the determination module and controls the unlock/lock state of the locking unit accordingly.

Figure 6:
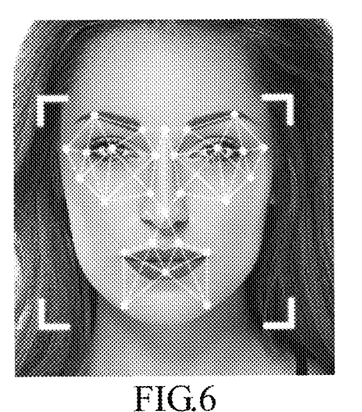
FIG. 6 is a flow chart of an unlocking method for the access control system with facial recognition of the present invention.

Please refer to FIG. 6, which is a flow chart illustrating an unlocking method for the access control system with facial recognition of the present invention, the unlocking method comprises a step S1 of initialization and a step S2 of facial recognition. In the initialization step S1, the administrator sets user information. In other words, the reference facial pattern group for target faces of the users who have permissions to unlock the access control system are formed and stored in the storage module. The amount of the users can be determined according to the capacity of the storage module, such as 10 to 50 users. Furthermore, the reference facial pattern group can be modified as required.

It is noted that, before the infrared camera and the optical camera collecting the image data pairs in the steps S1 and S2, the face image of the user captured by the optical camera is displayed in the image display region, such that the user can adjust his position to place his facial features within a pane of the image display region according to the displayed face image.

Specifically, the step S1 of initialization comprises the following steps:

S11: entering an initialization mode in which the infrared camera and the optical camera collect multiple image data pairs of a target face during a predetermined time.

Specifically, the predetermined time is generally a few seconds (e.g. 5 seconds), during which multiple image data pairs (e.g. 5 image data pairs) of a target face which are taken at the same time are collected. The five groups of image data pairs are respectively collected at $1^{st}$ second, $2^{nd}$ second, $3^{rd}$ second, $4^{th}$ second and $5^{th}$ second.

Then, step S12 is performed to process the above five image data pairs.

S12: extracting facial characteristics of the target face from the image data to form 2D image data pairs of infrared facial characteristics and optical facial characteristics corresponding to the image data pair and defining a facial characteristic region for each 2D image data. Wherein, each 2D image data pair of the infrared facial characteristics and the optical facial characteristics is taken as a reference facial pattern of the target face. Wherein, the facial characteristics comprises facial feature points of the target face and positional parameters between the facial feature points. The positional parameters comprise coordinates of the facial feature points and distances between the facial feature points.

Please refer to FIG. 5, which is a view illustrating facial characteristics of a target face, the facial feature points of a target face are distributed on a facial contour curve, ears, eyebrows, eyes, nose and/or lips of the target face. During determination, a target face can be authenticated by one or more of the above facial features. Of course, authentication by all of the above facial features achieves a higher recognition accuracy. Even a pair of twins can be recognized according to the present invention.

Figure 7:
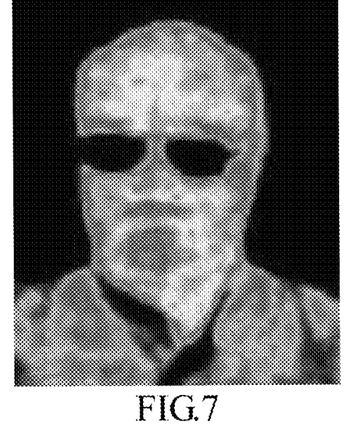
FIG. 7 is an infrared image of a user wearing a pair of glasses according to an embodiment of the present invention.

However, in some cases like a user wearing a pair of glasses that he does not normally wear (as shown in FIG. 7, the image data of the infrared eye characteristics is black), the infrared eye characteristics may not correspond to the optical eye characteristics, thus the facial recognition should be implemented by using other facial features.

It is known from FIG. 5 that the above 2D facial characteristics are selected from extreme facial feature points or variation facial feature points located on outlines of one or more facial features. For example, the facial feature points of the eyes can be selected from the furthest lateral points or the highest point of the eye sockets, or the points located at the pupils; the facial feature points of the nose can be selected from the highest point of the nose, or the points located at the nasal bone. The distance relationships between the facial feature points refer to the distance relationships between the above points like the distance between the furthest lateral points of the eye sockets.

S13: storing the reference facial patterns of the target face in the storage module, such that different reference facial patterns of different target faces stored in the storage module form a reference facial pattern group.

In the embodiment, the administrator has the permission to manage the reference facial pattern group through the management module. Specifically, the administrator may enter into a management interface provided by the management module through passcode or a RFID card to perform operations like new user registration or user information deletion (reference facial pattern deletion). Furthermore, the management module also manages log files and other unlocking means including passcode unlocking, RFID unlocking and/or unlocking by mechanical tools. For example, the management module allows other means such as passcode, RFID cards, mechanical keys to unlock the management functionality of the access control system, and if the administrator loses his permission (e.g. forget the passcode) to manage the access control system, he may use a mechanical key to restore the permission.

In a preferred embodiment of the present invention, in order to adapt to the variations of the facial characteristics of a child during his growth, a latest 2D image data pair of infrared image data and optical image data of the target child face is stored in the storage module as the reference facial pattern of the target child face.

Please refer to FIG. 5, the step S2 comprises the following steps:

Step S21: entering a recognition mode in which the infrared camera and the optical camera collect multiple image data pairs of a same target face during a predetermined time. The user may switch the on/off state of the infrared camera and the optical camera by the buttons provided on the hardware button region. The step S21 is the same as the step S11, which is not detailed herein.

Step S22: extracting facial characteristics of the target face from the image data pairs to form 2D image data pairs of infrared facial characteristics and optical facial characteristics, and defining a facial characteristic region for each 2D image data pair. Wherein, the facial characteristics comprises facial feature points of the target face. The step S22 is the same as the step S12, which is not detailed herein.

It is noted that, in order to compare the positional parameters of the facial characteristics extracted from the image data pair in the step S22 and S12 in the subsequent determination process, the facial characteristics extracted in the step S22 should be the same as that extracted in the step S12. Furthermore, the facial features with these facial characteristics extracted in the step S22 should have the same size with the facial features with the facial characteristics extracted in the step S12. In the embodiment, the facial characteristic region is assumed to be square.

Accordingly, the step S22 of facial recognition also comprises the following steps to determine the positional parameters of the extracted facial characteristics.

Firstly, a first facial characteristic region having a square shape is defined in the step S12. Any two facial characteristics T1 and T2 (i.e. two peak points of the upper lip) in the reference facial pattern of the target face are selected, distances between each facial characteristic and the sides of the first facial characteristic region as well as a first distance D between these two facial characteristics are calculated. Wherein, the facial characteristics T1 and T2 are set as reference points with fixed coordinates. For example, the facial characteristic T1 is set as a zero point. Then, the same facial characteristics T1' and T2' extracted in the step S22 are selected (i.e. two peak points of the upper lip), and a second distance D' between these two facial characteristics T1' and T2' are calculated.

Next, the image collected in the step S21 is enlarged or scaled down to make the second distance D' equal to the first distance D, the position of the image collected in the step S21 is also adjusted to make the facial characteristics T1' and T2' have the same coordinates with the facial characteristics T1 and T2. Therefore, the positional parameters of other extracted facial characteristics in the step S22 can be used to compare with those in the step S21.

Step S23: determining whether the image data pairs are collected from a real person according to the image data collected by the infrared camera; if yes, turning to step S24; or else, turning to step S25. The step S23 prevents imposturous unlock by a photo, video or wax of the user.

Step S24: comparing the 2D image data pairs of the infrared facial characteristics and the optical facial characteristics with the reference facial patterns to determine whether a similarity between at least one of the 2D image data pairs and at least one of the facial patterns in the facial pattern group is within a threshold range; if yes, unlocking the locking unit; or else, turning to step S25;

Specifically, the determination module compares the positional parameters of the infrared facial characteristics of any 2D image data pair converted from the image data pairs collected during the predetermined time in the step S21 with the positional parameters of the infrared facial characteristics in the reference facial patterns stored in the storage module, compares the positional parameters of the optical facial characteristics of any 2D image data pair converted from the image data pairs collected during the predetermined time in the step S21 with the positional parameters of the optical facial characteristics in the reference facial patterns stored in the storage module, and confirms correlations between the positional parameters of the infrared facial characteristics and the optical facial characteristics of the same 2D image data pair. If the facial characteristics are consistent with those in the reference facial patterns, the triggering unit unlocks the locking unit. Meanwhile, the image display region displays "unlock success". Then, after a preset time period (5 seconds), the triggering unit locks the locking unit again. If the facial characteristics are not consistent with those in the reference facial patterns, the triggering unit keeps the locking state of the locking unit and the image display regions displays "unlock failure".

Step S25: ending unlocking.

In addition, according to the present invention, an upper portion of the casing which is above the door handle has a reduced length, such that the access control system can be mounted to a door having a lock hole with the North America standard specifications and dimensions. Therefore, the access control system can be used without re-installing the door or re-punching the door.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. An access control system with facial recognition comprises: a casing; a door handle; an interaction unit; a locking unit, a triggering unit controlling an unlock/lock state of the locking unit and a facial recognition unit which are embedded inside the casing; wherein, the interaction unit has an operation panel arranged above the door handle and protruded from the casing at an inclined acute angle relative to a vertical surface of the casing;

the facial recognition unit comprises:
  a data storage module;
  an image collection module comprising an infrared camera and an optical camera which are disposed on the operation panel of the interaction unit in parallel having optical axes perpendicular to the operation panel;
  an image processing module receiving multiple image data pairs of a same target face which are collected by the infrared camera and the optical camera during a predetermined time, extracting facial characteristics of the target face from the image data pairs to form 2D image data pairs of infrared facial characteristics and optical facial characteristics, and defining a facial characteristic region for each 2D image data pair; wherein each image data pair is consisted by image data collected by the infrared camera and image data collected by the optical camera at the same time; the facial characteristics comprises facial feature points and positional parameters of the facial feature points; the positional parameters comprise coordinates of the facial feature points and distances between the facial feature points; when the access control system is initialized, each 2D image data pair of the infrared facial characteristics and the optical facial characteristics of a same target face is stored in the storage module as a reference facial pattern of the target face, different reference facial patterns of different target faces form a reference facial pattern group;
  a determination module determining whether the image data pairs are collected from a real person according to the image data collected by the infrared camera, and further comparing the 2D image data pairs of the infrared facial characteristics and the optical facial characteristics with the reference facial pattern group to determine whether a similarity between at least one of the 2D image data pairs and at least one of the reference facial patterns in the facial pattern group is within a threshold range;
the triggering unit controls the unlock/lock state of the locking unit according to determination results from the determination module.

2. The access control system according to claim 1, wherein the facial feature points of a target face are distributed on a facial contour curve, ears, eyebrows, eyes, nose and/or lips of the target face, positions of the facial feature points in a 2D image data pair of infrared facial characteristics and optical facial characteristics are determined according to positions of the infrared camera and the optical camera.

3. The access control system according to claim 2, wherein the positional parameters of the facial feature points in each 2D image data pair of infrared facial characteristics and optical facial characteristics are determined according to the coordinates of feature points and the distance between the feature points.

4. The access control system according to claim 2, wherein the threshold range is defined according to an allowable deviation range of each distance between the facial feature points of the target face and a corresponding distance between the same facial feature points in the reference facial patterns.

5. The access control system according to claim 1, wherein the operation panel of the interaction unit comprises an image display region for displaying an image of the target face captured by the optical camera, a touchscreen region for human interaction, and a hardware button region for turning on and turning off power and/or the infrared camera and the optical camera.

6. The access control system according to claim 5, wherein the image collection module comprises a pretreatment submodule which displays the image of the target face captured by the optical camera on the image display region before the infrared camera and the optical camera collecting the image data pairs, so as to enable a user to place the facial features within a pane of the image display region by adjusting position.

7. The access control system according to claim 1, wherein the acute angle is between 33° to 34°.

8. The access control system according to claim 1, wherein the reference facial pattern of the target face stored in the storage module is a latest collected 2D image data pair of the infrared facial characteristics and the optical facial characteristics of the target face.

9. The access control system according to claim 1, wherein the image collection unit comprises an infrared light lamp to increase an illumination intensity for the optical camera.

10. The access control system according to claim 1, wherein the optical camera is a dual lens optical camera.

11. The access control system according to claim 1, further comprising a management module; wherein the management module manages log files and other unlocking means including passcode unlocking, RFID unlocking and/or unlocking via mechanical tools.

12. The access control system according to claim 1, further comprising a WIFI module; wherein the WIFI module enables user remote unlocking.

13. An unlocking method of an access control system with facial recognition, comprising a step S1 of initialization and a step S2 of facial recognition; wherein, the step S1 comprises the following steps:
   S11: entering an initialization mode in which an infrared camera and an optical camera collect multiple image data pairs of a same target face during a predetermined time; wherein each image data pair is consisted by image data collected by the infrared camera and image data collected by the optical camera at the same time;
   S12: extracting facial characteristics of the target face from the image data pairs to form 2D image data pairs of infrared facial characteristics and optical facial characteristics, and defining a facial characteristic region for each 2D image data pair; wherein each 2D image data pair of the infrared facial characteristics and the optical facial characteristics is taken as a reference facial pattern of the target face; wherein, the facial characteristics comprises facial feature points of the target face and positional parameters of the facial feature points; the positional parameters comprise coordinates of the facial feature points and distances between the facial feature points;
   S13: storing the reference facial pattern of the target face; wherein the stored different reference facial patterns of different target faces form a reference facial pattern group;

the step S2 comprises the following steps:
   Step S21: entering a recognition mode in which the infrared camera and the optical camera collect multiple image data pairs of a same target face during a predetermined time; wherein each image data pair is consisted by image data collected by the infrared camera and image data collected by the optical camera at the same time;
   Step S22: extracting facial characteristics of the target face from the image data pairs to form 2D image data pairs of infrared facial characteristics and optical facial characteristics and defining a facial characteristic region for each 2D image data pair; wherein, the facial characteristics comprises facial feature points of the target face and positional parameters of the facial feature points; the positional parameters comprise coordinates of the facial feature points and distances between the facial feature points;
   Step S23: determining whether the image data pairs are collected from a real person according to the image data collected by the infrared camera; if yes, turning to step S24; or else, turning to step S25;
   Step S24: comparing the 2D image data pairs of the infrared facial characteristics and the optical facial characteristics with the reference facial patterns to determine whether a similarity between at least one of the 2D image data pairs and at least one of the facial patterns in the facial pattern group is within a threshold range; if yes, unlocking the locking unit; or else, turning to step S25;
   Step S25: ending unlocking.

* * * * *